United States Patent [19]

Tobias et al.

[11] 4,264,658
[45] Apr. 28, 1981

[54] THREE-COMPONENT POLYMERIC COATING FOR GLASS SUBSTRATE

[75] Inventors: John W. Tobias, Perrysburg; Lynn J. Taylor, Toledo, both of Ohio

[73] Assignee: Owens-Illinois, Inc., Toledo, Ohio

[21] Appl. No.: 81,509

[22] Filed: Oct. 3, 1979

Related U.S. Application Data

[63] Continuation of Ser. No. 924,401, Jul. 10, 1978, abandoned, which is a continuation of Ser. No. 821,436, Aug. 3, 1977, abandoned, which is a continuation of Ser. No. 588,254, Jun. 19, 1975, abandoned.

[51] Int. Cl.³ ............................................. B05D 3/06
[52] U.S. Cl. .................... 428/35; 428/336; 428/339; 428/425.6; 428/431; 428/435; 428/441; 428/522; 428/523
[58] Field of Search ................ 427/54; 428/35, 336, 428/339, 425.6, 431, 435, 441, 522, 523

[56] References Cited

U.S. PATENT DOCUMENTS 3,770,602  11/1973  D'Alelio ........................ 204/159.15

*Primary Examiner*—Bernard D. Pianalto
*Attorney, Agent, or Firm*—Charles S. Lynch; Myron E. Click; David H. Wilson

[57] ABSTRACT

In accordance with this invention, a chemically convertible polymeric coating composition is applied to the surface of a glass substrate and subsequently converted to a crosslinked coating by the application of UV light or another form of energy. The polymeric coating composition contains at least three basic components:
  (1) at least one rubbery thermoplastic organic polymer;
  (2) at least one organic photosensitizer; and
  (3) at least one polymerizable ethylenically unsaturated monomer having a functionality of at least two.

16 Claims, 2 Drawing Figures

U.S. Patent
Apr. 28, 1981
4,264,658
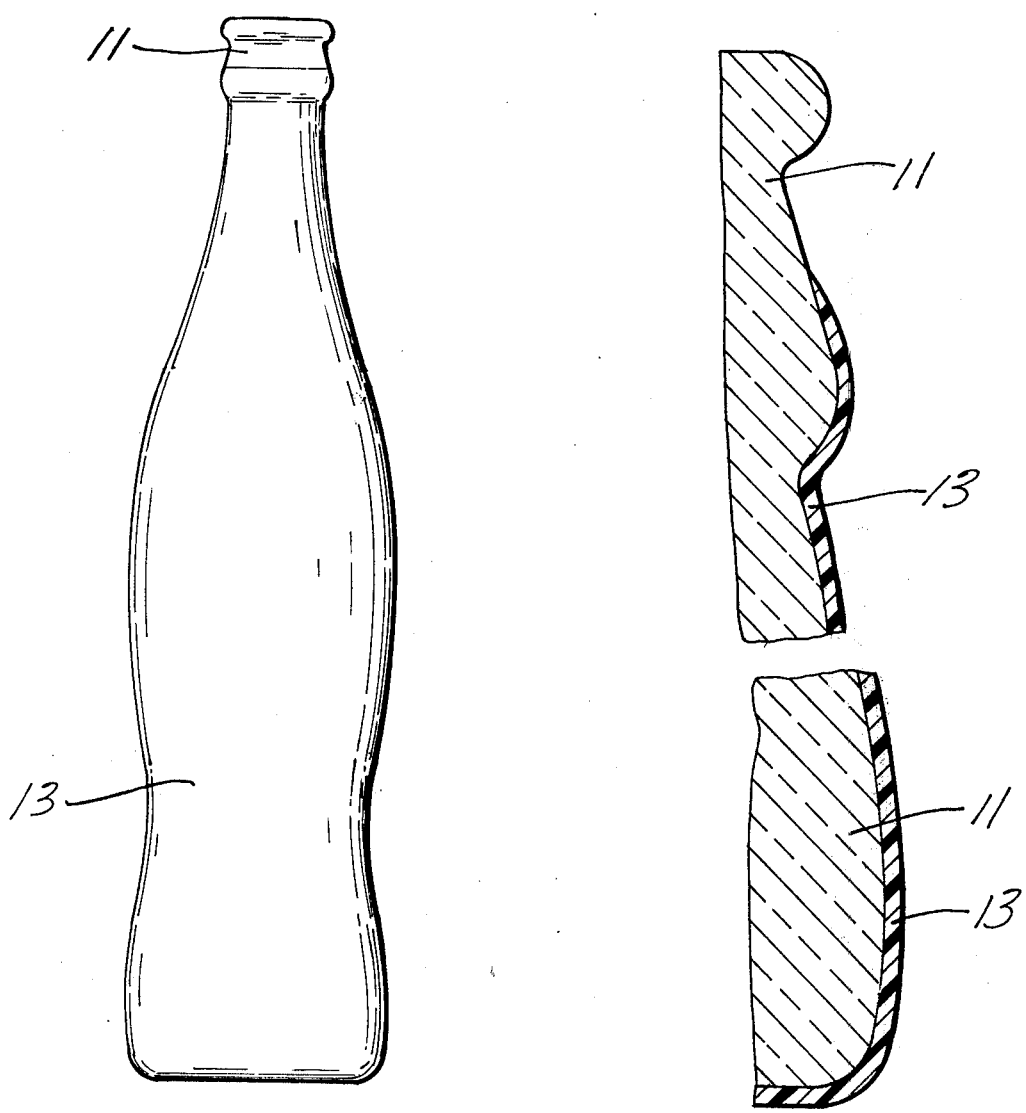

THREE-COMPONENT POLYMERIC COATING FOR GLASS SUBSTRATE

This is a continuation of application Ser. No. 924,401 filed July 10, 1978 which is a continuation of application Ser. No. 821,436 filed Aug. 3, 1977 which is a continuation of application Ser. No. 588,254 filed June 19, 1975, all now abandoned.

BACKGROUND OF THE INVENTION

It is well-known that glass in its pristine condition is a very strong materia, but that scratches and abrasion on the glass surface will considerably decrease its strength. Consequently, glass articles, for example, containers such as jars, bottles, tumblers, and the like which have an impermeable non-porous glass surface, have maximum strength immediately after formation; however, this strength diminishes when the glass article surface contacts other surfaces as may occur during the inspection, handling, packaging, shipping, and consumer use of the article.

To overcome this problem, there has been a great deal of research in the glass industry towards development of thin, tenaciously adhering, lubricious, damage-preventive coatings which preserve the glass strength and allow the glass article to be handled and used by the consumer.

In the glass container industry, such damage-preventive coatings have been primarily of two types. In one type, the container is coated with a thin organic coating at the "cold end" of the annealing lehr where the temperature is in the range of 200°-400° F. These coatings have been water soluble polyoxyethylene stearate as in U.S. Pat. No. 2,813,045; polyethylene as in U.S. Pat. No. 2,995,533; and U.S. Pat. No. 2,965,596; or other organic materials as in U.S. Pat. Nos. 3,445,275; 3,487,035; 3,357,853 and 3,296,174.

In the second type of coating, the glass container is first coated with metal oxides such as the oxides of tin, titanium, vanadium, or zirconium at the hot end of the annealing lehr where the temperature is in the range of 1000° to 1100° F. and then overcoated with a protective organic coating at the cold end of the lehr. Such dual coatings are illustrated in U.S. Pat. Nos. 3,323,889; 3,425,859; 3,598,632; 3,554,787; 3,498,825; 3,418,154; 3,420,693; 3,445,269; 3,407,085; 3,414,429; and 3,352,707. The above types of coatings are "production line" coatings because their application is accomplished as part of the forming and annealing sequence. The disclosures of these patents are incorporated herein by reference.

The success of some of these and other types of coatings, particularly those "cold end" coatings of polyethylene or polyoxyethylene stearate (with or without the "hot end" coating of $TiO_2$ or $SnO_2$) in preserving the strength of the glass containers during inspection, handling, filling, and use has permitted glass researchers to focus on the problems caused by mishandling and accidental misuse of glass containers by the consumer.

Glass containers are sometimes fractured by dropping or other accidental misuse. This problem is particularly acute when the glass container has pressurized contents such as in the case of beer or carbonated soft drinks.

In accordance with this invention, there is provided a coating for glass containers which is capable of retaining broken glass fragments upon fracture of the glass container so as to reduce the incidence of accidental injury.

Attention has been directed to this problem in the recent past. For instance, German patent disclosure No. 2,026,909, published Dec. 10, 1970, discloses coating a glass container with a loosely or firmly adhering plastic material designed to form a "bag" which retains glass fragments when the container is broken. The film is formed by fusing powdered polyethylene to the glass bottle. German patent document No. 2,149,219, published May 25, 1972, discloses coating glass containers with a film coating of a hydrolyzed ethylene-vinyl acetate copolymer. U.S. Pat. No. 3,178,049 discloses a light, composite glass container having a wall thickness of about 0.15 to 0.70 millimeters surrounded on the outside by an envelope of a thermoplastic material having a wall thickness at least equal to the glass. U.S. Pat. No. 3,415,673 discloses glass containers which are made resistant to breakage by coating the exterior surface with a thin, highly adhesive layer of plastic consisting essentially of ethylene and acrylic copolymers. A primer is used to tenaciously adhere the copolymer to the surface of the glass article.

Studies of the effect of organic coatings on the fragmentation of glass substrates have demonstrated that soft, flexible, "rubbery" polymeric coatings are extremely effective in retaining fragments. However, such coatings are not ordinarily suitable for use on glass containers, owing to their poor abrasion and mar resistance, low lubricity, and surface tack, which preclude the handling of such coated containers on automatic filling lines. The present invention improves the physical properties and surface characteristics of such coating materials through chemical crosslinking.

DESCRIPTION OF THE INVENTION

Any suitable glass substrate is contemplated. However, in one particular embodiment of this invention contemplated by the inventors, there is utilized a glass container. The following description of embodiments and specific practices of this invention will generally be discussed in terms of a glass container substrate.

In accordance with this invention, there is prepared a coated glass substrate, having fragment-retentive properties.

More particularly, in accordance with the practice of this invention, a chemically convertible coating composition is applied to the surface of a glass substrate and subsequently converted to a protective polymer film by irradiation with ultraviolet light or other forms of energy. The chemically convertible coating composition contains at least three ingredients:

(1) at least one rubbery thermoplastic organic polymer;
(2) at least one organic photosensitizer; and
(3) at least one polymerizable ethylenically unsaturated monomer having a functionality of at least two.

The term "rubbery thermoplastic organic polymer" may be defined as an elastomeric organic polymer having an ultimate elongation of at least 100%, the elongation being measured by ASTM D-638, published in the 1975 Annual Book of ASTM Standards, Part 35, pages 192 et seq, as published by the American Society for Testing and Materials. At the time of the application to the glass substrate, the polymer is thermoplastic, i.e. it is not crosslinked, but it can subsequently be cross-linked by the combined action of the organic photosensitizer compound, the polyfunctional monomer, and light or another form of energy.

Typical examples of suitable rubbery thermoplastic organic polymers include ethylene-vinyl acetate copolymers, hydrolyzed ethylene-vinyl acetate copolymers, ethylene-ethyl acrylate copolymers, ethylene-acrylic acid copolymers and their salts, ethylene-propylene copolymers, styrene-butadiene copolymers including both block and random copolymers, styrene-isoprene copolymers, acrylonitrile-butadiene copolymers, isobutylene-isoprene copolymers, polyurethanes, thermoplastic polyesters, ethylene-propylene-diene terpolymers, styrene-ethylene-butylene block terpolymers, polypentenamers, and polyamides derived from "dimer acid".

As used herein the term "photosensitizer" is to be given a broad interpretation, and is intended to describe organic compounds and compositions which become photoreactive upon exposure to light in the ultraviolet spectrum.

The photosensitizers useful in this invention are those compounds and compositions known to promote photooxidation, photo-polymerization, and photocrosslinking reactions.

Typical of the photosensitizers are aliphatic and aromatic ketones, for example: acetophenone, acetoin, 1'-aceto naphthone, 2'-acetonaphtone, anisoin, anthrone, bianthrone, benzil, benzoin, benzoin methyl ether, benzoin isopropyl ether, 1-decalone, 2-decalone, benzophenone, p-chlorobenzophenone, dibenzalacetone, benzoylacetone, benzylacetone, deoxyanisoin, deoxybenzoin, 2,4-dimethylbenzophenone, 2,5-dimethylbenzophenone, 3,4-dimethyl-benzophenone, 4-benzoylbiphenyl, butyrophenone, 9-fluorenone, 4,4-bis-(dimethylamino)-benzophenone, 4-dimethylaminobenzophenone, dibenzyl ketone, 4-methylbenzophenone, propiophenone, benzanthrone, 1-tetralone, 2-tetralone, valerophenone, 4-nitrobenzophenone, di-n-hexyl ketone, isophorone, and xanthone.

Aromatic ketones are preferred. Particularly preferred are benzophenone, benzoin, anthrone and deoxyanisoin.

Also useful as photosensitizers are quinones, for example: anthraquinone, 1-aminoanthraquinone, 2-aminoanthraquinone, 1-chloroanthraquinone, 2-chloroanthraquinone, 2-ethylanthraquinone, 1-methylanthraquinone, 2-methylanthraquinone, 1-nitroanthraquinone, 2-phenylanthraquinone, 1,2-napthoquinone, 1,4-naphthoquinone, 2-methyl-1,4-naphthoquinone, 1,2-benzanthraquinone, 2,3-benzanthraquinone, phenanthrenequinone, 1-methoxyanthraquinone, 1,5-dichloroanthraquinone, and 2,2'-dimethyl-1,1'-dianthraquinone, and anthraquinone dyes. Preferred quinones are 2-methyl anthraquinone, 2-chloroanthraquinone and 2-ethylanthraquinone.

Still other compounds which can be used as the photosensitizer are azo compounds. Typical of the useful compounds are: 2-azo-bis-isobutyronitrile, 2-azo-bis-propionitrile, dimethyl-2-azo-bis-isobutyrate, 1-azo-bis-1-cyclohexanecarbonitrile, 2-azo-bis-2-methylheptanitrile, 2-azo-bis-2-methylbutyronitrile, 4-azo-bis-4-cyanopentanoic acid, azodicarbonamide, azobenzene, and azo dyes.

Other photosensitizers will be apparent to those skilled in the art. Among these are: aromatic hydrocarbons such as, naphthalene, anthracene, phenanthrene, and 1-phenyldecane; aromatic nitro compounds such as, nitrobenzene, p-nitroanisole, 4-nitrobiphenyl, p-nitroaniline, and 2,4,6-trinitroaniline; aldehydes, for example, 2-ethylhexanal, tetradecyl aldehyde, phenylacetaldehyde, benzaldehyde, p-anisaldehyde, 4-benzyloxybenzaldehyde, 3,4-dibenzyloxybenzaldehyde, p-n-octyloxybenzaldehyde, 1-naphthaldehyde, 2-naphthaldehyde, and 9-anthraldehyde; organic sulfur compounds, for example, diphenyl disulfide, dibenzyl disulfide, dibenzoyl disulfide, dilauroyl disulfide, 1-naphthalenethiol, diisopropylbenzene thiol, 2-mercaptobenzothiazole, 2-mercaptobenzimidazole, tetramethylthiuram monosulfide, tetramethyl thiuram disulfide, ethyl-2-benzothiazylsulfonate, and p-toluenesulfonyl chloride; organic halogen compounds such as chlorinated paraffins, chlorinated biphenyls and polyphenyls, chlorinated toluene, xylenes, etc., benzyl chloride, 3,4-dimethylbenzyl chloride, benzyhydryl chloride, benzal chloride, benzotrichloride, chlorinated naphthalenes, 1-chloromethylnaphthalene, tetrachloro-tetrahydronaphthalene, phenacyl chloride, phenacyl bromide, and styrene dibromide; aryl amines such as aniline, N,N-diethyl aniline, diphenylamine, triphenylamine, 1-naphthylamine, 2-naphthylamine, p,p'-benzylidenebis (N, N-dimethylaniline), p,p',p''-triaminotriphenylmethane, p,p',p''-triaminotriphenyl carbinol, and 4,4'-diaminobiphenyl. Combinations of two or more photosensitizers may also be used.

Still other photosensitizers can be found in the following references: J. Kosar, "Light-Sensitive Systems", John Wiley & Sons, New York, 1965, Chapters 4 ("Unsaturated Compounds"), 5("Photopolymerization Processes") and 8("Photochemical Formation and Destruction of Dyes"); G. Oster and N. L. Yang, "Photopolymerization of Vinyl Monomers, "Chem. Revs. 68 , 125–151(1968); J. F. Rabek, "Photosensitized Processes in Polymer Chemistry: A Review", Photochem. Photobiol. 7, 5–57(1968); G. Delzenne, "Sensitizers of Photopolymerization," Ind. Chim. Belge 24, 739–764(1969); C. M. McCloskey and J. Bond, "Photosensitizer for Polyester-vinyl Polymerization," Ind. Eng. Chem. 47, 2125–2129(1955).

Polymerizable ethylenically unsaturated monomers having a functionality of two or greater are present in the coating composition. Typical examples of such polyfunctional monomers include allyl acrylate, allyl methacrylate, Bisphenol A dimethacrylate, diallyl phthalate, diallyl adipate, divinyl benzene, diethylene glycol diacrylate, diethylene glycol dimethacrylate, ethylene diacrylate, ethylene dimethacrylate, hexamethylene diacrylate, methallyl acrylate, pentaerythritol tetraacrylate, pentaerthyritol triacrylate, neopentyl glycol dimethacrylate, tetraethylene glycol dimethacrylate, diallyl allylphosphonate, triallyl cyanurate, triallyl phosphate, and trimethylolpropane trimethacrylate.

The term "functionality," as used herein, is defined as the number of carbon-carbon double bonds (i.e. ethylenically unsaturated groups) present per molecule of the polymerizable monomer. Thus a monomer having a functionality of two would contain two carbon-carbon double bonds per molecule of monomer. The term polyfunctional is applied to monomers having a functionality of two or more.

Application of the coating composition to the glass substrate may be accomplished by a variety of methods known in the coating art, including spraying, dipping, roller coating, flow-coating, or silk-screening of liquid compositions containing solvents or dispersants in addition to the essential polymer and the organic photosensitizer compound. Also there may be used hot-melt coating, extrusion coating, powder coating, and the application of a pre-formed film or sleeve of the cross-linkable polymeric composition.

Following application of the coating to the substrate, the coating is dried, if necessary, to remove any volatile materials such as solvents or dispersants, and simultaneously or subsequently crosslinked by the application of radiant energy, such as visible, or ultraviolet radiation; ionizing radiation, or radiofrequency or microwave radiation.

In addition to the essential polymer, photosensitizer, and polyfunctional monomer, the protective coating composition may contain one or more additional ingredients which may modify its appearance or properties, but do not detract from its essential tendency to retain glass fragments. Such additional ingredients may include colorants, plasticizers, surfactants, reinforcing agents, foaming agents, antioxidants, ultraviolet stabilizers, antistatic agents, lubricants, flame retardants, adhesion promoters, and processing aids. Incorporation of silane adhesion promoters is particularly advantageous in those applications requiring alkali resistance, i.e. coated returnable glass containers.

In one preferred embodiment of this invention, a solution containing a rubbery thermoplastic polymer, an organic photosensitizer, a polyfunctional monomer, and a suitable volatile solvent is applied to the surface of a glass container. The coating is dried and then crosslinked by a source of radiation, preferably in the ultraviolet range.

In a further preferred embodiment of the present invention, an organic photosensitizer and a polyfunctional monomer are incorporated into an aqueous emulsion ("latex") of a rubbery thermoplastic polymer. The resulting emulsion is applied to the surface of a glass substrate, dried at an ambient or elevated temperature, and then crosslinked by irradiating in the ultraviolet range.

In a further specific embodiment of the present invention, a blowing agent such as an azo compound is incorporated into a liquid coating composition which also contains a rubbery thermoplastic polymer, an organic photosensitizer, a polyfunctional monomer, and a suitable solvent or dispersant. The resulting composition is applied to a glass surface, dried, heated, and irradiated with ultraviolet light to produce a glass substrate bearing a cellular crosslinked protective coating.

The coatings of the present invention may be used in laminar combinations with other coatings, such as thin, lubricious coatings of oxidized polyethylene; primers, particularly those containing silane coupling agents, which increase adhesion to glass even in the presence of water and alkali; and abrasion-resistant exterior coatings.

The crosslinked polymeric coatings of this invention are typically of sufficient thickness (0.002 inch or greater) to resist shattering of a pressurized container, e.g. one filled with a carbonated soft drink or beer. However, thinner protective coatings of the same type may be used, particularly for applications in which the container does not contain internal pressure.

In the basic three-component system, it is contemplated that the cross-linkable polymeric compositions of the present invention will ordinarily contain about 70 to 98.99% by weight of the rubbery thermoplastic organic polymer, about 0.01 to 10% by weight of the organic photosensitizer, and about 1 to 29.99% by weight polyfunctional monomer.

The proportions of such additional ingredients as may be present in the three component systems are not considered in calculating these percentages.

BRIEF DESCRIPTION AND DETAILED DESCRIPTION OF THE DRAWING

The following figures represent one of the best embodiments contemplated by the inventor in the practice of this invention.

FIG. 1 is a side view of a glass container 11 coated on its external surface with the protective polymeric coating 13 of this invention.

FIG. 2 is an enlarged, fragmented cross-sectional view of the glass container 11 shown in FIG. 1 illustrating a more precise structure of the protective coating 13.

The container 11, which has an impermeable non-porous glass surface for retaining fluids, may be of any desired geometric shape. Although the polymeric coating 13 is illustrated as gradually terminating at the top portion of the container, it could be extended over the entire neck of the container. Likewise, further organic or inorganic coatings can be applied before or after the application of the protective polymeric coating 13.

We claim:

1. A process for forming a protective film on the surface of a glass container having an impermeable non-porous glass surface which comprises;

applying a polymeric crosslinkable coating composition to the glass container surface, the coating composition comprising about 70% to 98.99% by weight of at least one rubbery thermoplastic organic polymer having an ultimate elongation of at least 100%, about 0.01% to 10% by weight of at least one organic photosensitizer which becomes photoreactive upon exposure to light in the ultraviolet spectrum, and about 1% to 29.99% by weight of at least one polymerizable ethylenically unsaturated monomer having at least two carbon-carbon double bonds, and applying ultraviolet radiation to the polymeric composition in situ on the container surface so as to crosslink the composition and form a protective scratch- and abrasion-resistant polymeric film.

2. The process of claim 1 wherein the amount of coating composition applied is sufficient to provide a film thickness of at least 0.002 inch.

3. The process of claim 2 wherein said polymerizable ethylenically unsaturated monomer is selected from the group consisting of allyl acrylate, allyl methacrylate, Bisphenol A dimethacrylate, diallyl adipate, divinyl benzene, diethylene glycol diacrylate, diethylene glycol dimethacrylate, ethylene diacrylate, ethylene dimethacrylate, hexamethylene diacrylate, methallyl acrylate, pentaerythritol tetraacrylate, pentaerthyritol triacrylate, neopentyl glycol dimethacrylate, tetraethylene glycol dimethacrylate, diallyl allylphosphonate, triallyl cyanurate, triallyl phosphate and trimethylolpropane trimethacrylate.

4. The process of claim 3 wherein said rubbery thermoplastic organic polymer is selected from the group consisting of ethylene-vinyl acetate copolymers, hydrolyzed ethylene-vinyl acetate copolymers, ethylene-ethyl acrylate copolymers, ethylene-acrylic acid copolymers and their salts, ethylene-propylene copolymers, styrene-butadiene copolymers, styrene-isoprene copolymers, acrylonitrile-butadiene copolymers, isobutylene-isoprene copolymers, polyurethanes, thermoplastic polyesters, ethylene-propylene-diene terpolymers, styrene-ethylene-butylene block terpolymers and polypentanamers.

5. As an article of manufacture, a glass container having an impermeable non-porous glass surface at least partially coated with a protective scratch- and abrasion-resistant polymeric film having a thickness sufficient to resist glass shattering of the container under pressure, the crosslinked film having been formed in situ on the surface of the glass container from a composition comprising about 70% to 98.99% by weight of at least one rubbery thermoplastic organic polymer having an ultimate elongation of at least 100%, about 0.01% to 10% by weight of at least one organic photosensitizer which becomes photoreactive upon exposure to light in the ultraviolet spectrum, and about 1% to 29.99% by weight of at least one polymerizable ethylenically unsaturated monomer having at least two carbon-carbon double bonds.

6. The article of claim 5 wherein said polymerizable ethylenically unsaturated monomer is selected from the group consisting of allyl acrylate, allyl methacrylate, Bisphenol A dimethacrylate, diallyl adipate, divinyl benzene, diethylene glycol diacrylate, diethylene glycol dimethacrylate, ethylene diacrylate, ethylene dimethacrylate, hexamethylene diacrylate, methallyl acrylate, pentaerythritol tetraacrylate, pentaerthyritol triacrylate, neopentyl glycol dimethyacrylate, tetraethylene glycol dimethyacrylate, diallyl allylphosphonate, triallyl cyanurate, triallyl phosphate and trimethylolpropane trimethacrylate.

7. The article of claim 6 wherein said rubbery thermoplastic polymer is selected from the group consisting of ethylene-vinyl acetate copolymers, hydrolyzed ethylene-vinyl acetate copolymers, ethylene-ethyl acrylate copolymers, ethylene-acrylic acid copolymers and their salts, ethylene-propylene copolymers, styrene-butadiene opolymers, styrene-isoprene copolymers, acrylonitrile-butadiene copolymers, isobutylene-isoprene copolymers, polyurethanes, thermoplastic polyesters, ethylene-propylene-diene terpolymers, styrene-ethylene-butylene block terpolymers and polypentanamers.

8. The article of claim 5 wherein the thickness of the polymeric film is at least 0.002 inch.

9. A process for forming a protective film on the surface of a glass container having an impermeable non-porous glass surface which comprises;
applying a polymeric crosslinkable coating composition to the glass container surface, the coating composition consisting essentially of about 70% to 98.99% by weight of at least one rubbery thermoplastic organic polymer having an ultimate elongation of at least 100%, about 0.01% to 10% by weight of at least one organic photosensitizer which becomes photoreactive upon exposure to light in the ultraviolet spectrum, and about 1% to 29.99% by weight of at least one polymerizable ethylenically unsaturated monomer having at least two carbon-carbon double bonds,
and applying ultraviolet radiation to the polymeric composition in situ on the container surface so as to crosslink the composition and form a protective scratch- and abrasion-resistant polymeric film.

10. The process of claim 9 wherein the amount of coating composition applied is sufficient to provide a film thickness of at least 0.002 inch.

11. The process of claim 10 wherein said polymerizable ethylenically unsaturated monomer is selected from the group consisting of allyl acrylate, allyl methacrylate, Bisphenol A dimethacrylate, diallyl adipate, divinyl benzene, diethylene glycol diacrylate, diethylene glycol dimethacrylate, ethylene diacrylate, ethylene dimethacrylate, hexamethylene diacrylate, methallyl acrylate, pentaerythritol tetraacrylate, pentaerthyritol triacrylate, neopentyl glycol dimethacrylate, tetraethylene glycol dimethacrylate, diallyl allylphosphonate, triallyl cyanurate, triallyl phosphate and trimethylolpropane trimethacrylate.

12. The process of claim 11 wherein said rubbery thermoplastic organic polymer is selected from the group consisting of ethylene-vinyl acetate copolymers, hydrolyzed ethylene-vinyl acetate copolymers, ethylene-ethyl acrylate copolymers, ethylene-acrylic acid copolymers and their salts, ethylene-propylene copolymers, styrene-butadiene copolymers, styrene-isoprene copolymers, acrylonitrile-butadiene copolymers, isobutylene-isoprene copolymers, polyurethanes, thermoplastic polyesters, ethylene-propylene-diene terpolymers, styrene-ethylene-butylene block terpolymers and polypentanamers.

13. As an article of manufacture, a glass container having an impermeable non-porous glass surface at least partially coated with a protective scratch- and abrasion-resistant polymeric film having a thickness sufficient to resist glass shattering of the container under pressure, the crosslinked film having been formed in situ on the surface of the glass container from a composition consisting essentially of 70% to 98.99% by weight of at least one rubbery thermoplastic organic polymer having an ultimate elongation of at least 100%, about 0.01% to 10% by weight of at least one organic photosensitizer which becomes photoreactive upon exposure to light in the ultraviolet spectrum, and about 1% to 29.99% by weight of at least one polymerizable ethylenically unsaturated monomer having at least two carbon-carbon double bonds.

14. The article of claim 13 wherein the thickness of the polymeric film is at least 0.002 inch.

15. The article of claim 14 wherein said polymerizable ethylenically unsaturated monomer is selected from the group consisting of allyl acrylate, allyl methacrylate, Bisphenol A dimethacrylate, diallyl adipate, divinyl benzene, diethylene glycol diacrylate, diethylene glycol dimethacrylate, ethylene diacrylate, ethylene dimethacrylate, hexamethylene diacrylate, methallyl acrylate, pentaerythritol tetraacrylate, pentaerthyritol triacrylate, neopentyl glycol dimethacrylate, tetraethylene glycol dimethacrylate, diallyl allylphosphonate, triallyl cyanurate, triallyl phosphate and trimethylolpropane trimethacrylate.

16. The article of claim 15 wherein said rubbery thermoplastic polymer is selected from the group consisting of ethylene-vinyl acetate copolymers, hydrolyzed ethylene-vinyl acetate copolymers, ethylene-ethyl acrylate copolymers, ethylene-acrylic acid copolymers and their salts, ethylene-propylene copolymers, styrene-butadiene copolymers, styrene-isoprene copolymers, acrylonitrile-butadiene copolymers, isobutylene-isoprene copolymers, polyurethanes, thermoplastic polyesters, ethylene-propylene-diene terpolymers, styrene-ethylene-butylene block terpolymers and polypentanamers.

* * * * *